Figure 1:
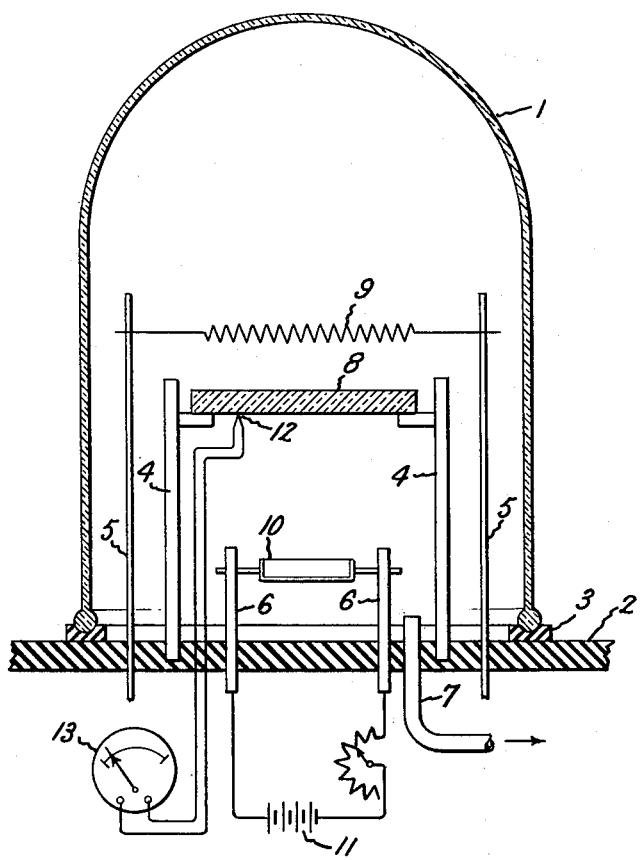

Inventors:
Henry D. Coghill,
Lewis R. Koller,
by Paul A. Frank,
Their Attorney.

United States Patent Office 2,867,541
Patented Jan. 6, 1959

2,867,541
METHOD OF PREPARING TRANSPARENT LUMINESCENT SCREENS

Henry D. Coghill, Burnt Hills, and Lewis R. Koller, Schenectady, N. Y., assignors to General Electric Company, a corporation of New York Application February 25, 1957, Serial No. 641,985

13 Claims. (Cl. 117—33.5)

The present invention relates to methods for preparing transparent luminescent screens and, more particularly, to such methods which utilize the technique of vacuum evaporation.

Conventional cathode ray tube screens such as those utilized in television picture tubes are prepared by liquid settling, spraying, or other techniques which result in the deposition of a thick, particulate, grainy phosphor coating on the interior of the tube screen. While these screens exhibit high luminous efficiency and are suitable for most uses, they possess certain disadvantages which can be overcome by improved transparent luminescent screens. Such screens may, in theory, be produced by evaporating luminescent phosphor material upon the tube screen to form a continuous non-particulate phosphor layer. Many attempts have previously been made to produce such screens by evaporation techniques. Heretofore, these attempts have been unsuccessful, since the phosphor films produced thereby either exhibited extremely low luminescent efficiency or were not properly bonded to the faceplate upon which they were deposited and would subsequently peel off. A further disadvantage of screens produced in accord with prior art evaporation techniques, is that evaporated phosphor films produced in accord with these techniques exhibited short lifetimes and would either burn or lose their luminous efficiency with use.

Accordingly, one object of the present invention is to provide improved methods for the preparation of transparent luminescent phosphor screens.

A further object of the invention is to provide methods for preparing thin transparent luminescent screens which exhibit high luminous efficiency and long life.

Yet another object of the invention is to provide methods for preparing evaporated phosphor screens which form a good bond with suitable substrates.

In accord with one aspect of our invention, transparent luminescent screens are prepared by a two-step evaporation process. A first thin transparent crystalline layer of a phosphor material is prepared by evaporating a phosphor material upon a suitable substrate. After the formation of a first layer a second amorphous layer is evaporated thereupon. After the two-step evaporation process, the substrate containing the luminescent phosphor thereupon is removed and heat treated in a suitable atmosphere until the desired amount of crystallization and activation of the second layer has been attained.

Figure 2:
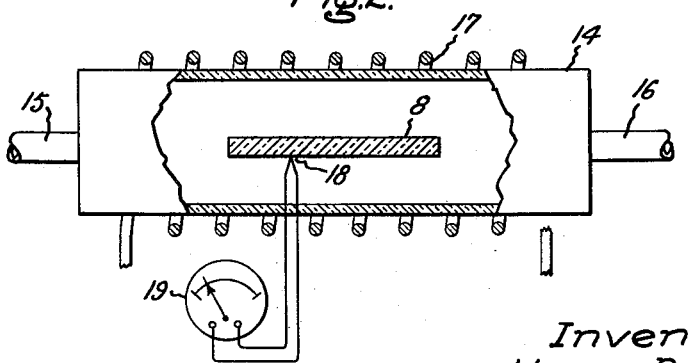

The novel features believed characteristic of the invention are set forth in the appended claims. The invention itself, however, together with further advantages and objects thereof, may best be understood with reference to the following detailed description taken in connection with the accompanying drawing in which;

Figure 1 represents a suitable apparatus for evaporating films in accord with the invention, and Figure 2 represents a suitable apparatus for heat treating phosphor films in accord with the invention.

As is mentioned hereinbefore, attempts have previously been made to provide transparent luminescent screens by vacuum evaporation. These methods, however, have not been successful in producing useful luminescent screens. We have found that evaporated films of luminescent materials produced in accord with prior art methods, are either of extremely low luminous efficiency or do not bond well to the substrate upon which they are deposited. We have further found that the key to success in the production of evaporated transparent luminescent screens lies in the control of the temperature of the substrate upon which the screens are deposited.

From our work we have determined the following information relative to the evaporation of luminescent phosphors. In order that a luminescent material have a high luminescent efficiency, the host phosphor material must be crystalline and have suitably incorporated therein a principal activator material and a secondary or coactivator material. For phosphors of the zinc cadmium, sulfo selenide family, the principal activators may conveniently be those of group IB of the periodic chart of the elements, such as copper and silver, which may for example be added in quantities of from 0.0001 to 0.1% by weight, or the materials from group IVB of the periodic table of the elements, as for example, phosphorus and arsenic, which may for example be added in quantities of from 0.1 to 5% by weight. These quantities of activators are well known to the art and are referred to as "activator quantities." While these activators have been set forth by way of example, it will be appreciated that our invention may be practiced with any known luminescence activators for the zinc cadmium, sulfo selenide phosphors. Thus for example a molar excess of zinc results in self-activated zinc sulfide. For the zinc cadmium, sulfo selenide prosphors, luminescent co-activators may for example by the halogens, preferably chlorine, although other known co-activators are equally suitable.

It is a relatively easy matter to evaporate a host phosphor material and principal activator therefor by vacuum evaporation upon a suitable substrate when the phosphor material already contains a principal activator either by evaporating the already activated phosphor material, or by simultaneously evaporating the principal activator from a separate evaporation boat. It is, however, extremely difficult to evaporate a suitable co-activator simultaneously with the evaporation with the host phosphor and the principal activator. This is particularly true when the co-activator utilized is a halogen as for example chlorine. Accordingly, we have found it most convenient to prepare the luminescent phosphor layer in transparent form upon a suitable substrate, and to subsequently cause the incorporation of a co-activator into the layer by a suitable heat treatment thereafter.

We have discovered that luminescent materials of the zinc cadmium, sulfo selenide family deposited upon a substrate while the substrate is maintained at a low temperature, for example, lower than 100° C. do not properly bond to the substrate, so that when the substrate is incorporated into a cathode ray tube, as the faceplate thereof, the low-temperature-deposited phosphor layer peels away from the substrate. Accordingly, in order that proper bonding be achieved, the phosphor must be evaporated onto the substrate while it is maintained at a temperature in excess of 100° C. Phosphors of the zinc cadmium, sulfo selenide family deposited at temperatures above 100° C. exist in a crystalline state, as determined by electron diffraction analysis. The state is believed to be the $\alpha$ or hexagonal crystal state.

We have further found, however, that when a phosphor is evaporated onto a substrate which is maintained at a temperature in excess of 100° C., in order that the phosphor form a good bond thereto, the phosphor may not be properly activated by subsequent heat treatment in a suitable atmosphere as is mentioned hereinbefore. This is believed to occur because, for proper activation, atoms of a luminescence co-activator must diffuse into the phosphor layer and become intimately associated with atoms of the principal activator within the phosphor crystal lattice. When the phosphor exists in a crystalline state and is heat treated in an atmosphere containing the selected co-activator, the co-activator, rather than diffusing into the crystals to become associated with the principal activator, which condition is necessary for luminescence, preferentially diffuse along the crystal boundaries and interfaces, and suitable activation does not occur.

We have further discovered, however, that this difficulty may be overcome by causing the phosphor, which is to be later activated to luminescence by heat treatment in an atmosphere of the co-activator, to be deposited in an amorphous state. This may be achieved by evaporating the luminescent material, later to be activated by heat-treatment, while the substrate is maintained at a temperature of less than 100° C. Electron diffraction studies of zinc cadmium, sulfo selenide phosphors indicates that these phosphors deposited upon substrates maintained at temperatures below 100° C. exist in the amorphous state. When the amorphous layer of luminescent material is subsequently heat-treated in an atmosphere of the selected co-activator, the co-activator readily diffuses into the amorphous phosphor material. Thus, atoms of the co-activator become operatively associated with atoms of the principal activator, already present within the phosphor, to accomplish the conditions necessary for luminescence. As heat treatment continues, after the diffusion of the co-activator atoms into the phosphor layer, the high temperature heat treatment causes the amorphous luminescent material to crystallize, thus resulting in a film which is luminescent when excited by cathode rays.

In accord with our invention, therefore, we first deposit upon a suitable substrate a first crystalline layer of a suitable phosphor material. This first layer is deposited while the substrate is maintained at a temperature in excess of 100° C., preferably from 125° C. to 200° C. Since this first layer is crystalline, it bonds well to the substrate and does not peel away therefrom when the substrate is later incorporated in a cathode ray tube as faceplate thereof. We next, in a second operation, evaporate a second amorphous layer of the same phosphor material together with a principal activator therefor onto the already deposited layer upon the substrate. The second evaporation operation step is carried out while the substrate is maintained at a low temperature which may suitably be from 0° C. to 100° C. This second operation results in deposition of an amorphous layer of host phosphor and principal activator therefor. The substrate is then removed from the evaporation chamber and is placed in a heat-treatment furnace where it is heated in the presence of an atmosphere containing the co-activator material. Since the last deposited layer is in an amorphous state, the co-activator material readily diffuses thereinto, becoming intimately associated with the already present principal activator material, causing the creation of luminescence sites. After the diffusion of the co-activator material into the amorphous layer, the layer becomes crystalline and is suitably activated for the emission of light when excited by cathode rays.

Figure 1 of the drawing represents a vacuum evaporation apparatus suitable for use in the practice of the invention. In Figure 1, a suitable bell jar 1 is mounted upon an insulating table 2 and sealed thereto with vacuum seal 3. Insulating table top 2 has therein suitable openings for the passage therethrough of substrate support members 4, heater support members and conductors 5, evaporation boat support members and conductors 6, and evacuation conduit 7. A suitable substrate which may, for example, be glass, Pyrex glass, Vycor glass, quartz, or any suitable transparent member is mounted upon support members 4 and held thereby in a horizontal position. A substrate heater 9, which may conveniently be an electric resistance heater, is supported upon electrically conducting heater support members 5 in close juxtaposition to substrate 8 so that substrate 8 may be heated thereby. An evaporation boat 10 is supported immediately under substrate 8 and is electrically connected to conducting evaporation boat supports 6. Evaporation boat 10 comprises a suitable high temperature, high resistance material as for example tungsten, molybdenum or like metals. Electrical energy for the evaporation of phosphor samples is supplied to evaporation boat 10, which acts as its own resistance heater, by a suitable source of electrical energy represented conventionally by battery 11. A thermocouple 12 is connected in heat conducting relationship with the under surface of substrate 8 to accurately measure the temperature thereof. The temperature of the under surface of substrate 8 is indicated upon meter 13.

In practicing the invention, a suitable substrate 8 which may conveniently be glass, Pyrex glass, Vycor glass, quartz, or any suitable transparent material is first cleaned with any conventional polishing or cleaning material. After cleaning the substrate is washed in distilled water, air dried, and mounted in place in the apparatus. A solidified mass of the phosphor to be utilized is next placed within evaporation boat 10. The phosphor material may conveniently be any phosphor of the zinc cadmium sulfo selenide family including zinc sulfide, cadmium sulfide, zinc selenide, cadmium selenide, or a composite zinc cadmium sulfide, zinc cadmium selenide or zinc-cadmium sulfo-selenide. The phosphor is prepared in a compressed solid form, as for example, by pressing a conventional powdered phosphor at high pressure into a pellet. Alternatively, a single crystal or a plurality of single crystals of a suitable phosphor may be utilized. The bell jar is then vacuum sealed to baseplate 2 and the temperature of the substrate is raised to a suitable high temperature conveniently from 300° C. to 400° C. to degas substrate 8. At the same time bell jar 1 is evacuated to a pressure of approximately a few microns of mercury or less and maintained at this pressure during the entire process. Degassing may continue for approximately 10 to 30 minutes in order to remove all occluded and adsorbed gases from substrate 8.

After degassing, the temperature of substrate 8 is lowered by properly controlling the current passed through heater 9 to lower the temperature of substrate 8 to operating temperature as indicated by thermocouple 12 upon meter 13. For the first evaporation step, substrate 8 may be maintained at a temperature of from 100° C. to 650° C. If substrate 8 is maintained at a temperature of less than 100° C. the phosphor film formed thereupon does not properly bond thereto. If substrate 8 is maintained at a temperature in excess of 650° C. it is difficult to form an evaporated phosphor layer thereupon since, above 650° C., the phosphor formed upon substrate 8 re-evaporates therefrom as rapidly as it is deposited. In accord with our invention, we prefer to maintain substrate 8 at a temperature of from 125° C. to 200° C. within which range layers of the best bonding characteristics are attained. Once the temperature of substrate 8 has reached the proper value, as indicated by the temperature measuring apparatus, electrical current is supplied through conductors 6 to evaporation boat 10 to raise the temperature thereof to a temperature from approximately 1185° C. to 2000° C. Below 1185° C. the evaporation of zinc-cadmium sulfoselenide phosphors does not proceed at an appreciable rate. Above 2000° C. the evaporation proceeds at too rapid a rate and particles may be ejected. We have found that optimum evaporation rates are obtained when a temperature of evaporation boat 10 is maintained at approximately 1500° C. This temperature may conveniently be observed by an optical pyrometer.

Evaporation under the aforementioned conditions is carried out for whatever time is desired in order to cause the formation of a desired thickness of phosphor upon substrate 8. Since the function of the first-deposited film is only to form a good physical bond with substrate 8 this film need not be very thick. The first-deposited phosphor layer may be as thin as 0.1 micron and may be any greater thickness without limit since the layer is as transparent as the substrate. In practice the first-deposited layer is not made greater than 1 micron thick, since no useful result is attained by thicknesses greater than 1 micron. In practice the first-deposited layer may conveniently be made approximately .25 micron thick, which thickness is observed by the apparent changes in color of the layer as formed, the thickness of .25 micron being evidenced by the occurrence of two orders of interference colors. This thickness is generally attained by evaporation at a temperature of 1500° C. for approximately three minutes. Since the first-deposited phosphor layer plays no part in the emission of light from the final resultant evaporated film, no principal luminescent activator need be incorporated with the host phosphor. It is only necessary that the host phosphor be the same as that which is deposited in the second operation. However, since it is convenient to perform the first and second evaporation steps without dismantling the vacuum apparatus, using the same charge of phosphor in evaporation boat 10, it is convenient to utilize an activated phosphor for the first evaporation step, or a mixture of host phosphor material and principal activator therefor.

After the deposition of the first-deposited phosphor layer as described hereinbefore, current to evaporation boat 10 is discontinued and current through substrate heater 9 is lowered until the temperature thereof reaches a suitable value for the second evaporation step. This temperature may be from 0° C. to 100° C. for the formation of an amorphous phosphor layer. At temperatures above 100° C., evaporated films so formed are generally crystalline and may not be subsequently heat treated to induce luminescent properties therein. At temperatures below 0° C., gas adsorption upon substrate 8 and water vapor condensation thereupon, makes the formation of useful phosphor films difficult. In accord with our invention we have found that superior luminescent films are formed when substrate 8 is preferably maintained at a temperature of from 25° C. to 80° C.

Once the temperature of substrate 8 has been adjusted to the desired value, without changing the vacuum conditions within bell jar 1 current is once again passed through evaporation boat 10 to cause the evaporation of phosphor layers therefrom and the condensation of these vapors upon the already-deposited phosphor layer upon substrate 8. As with the previously described step, the temperature of evaporation boat may be maintained at any value from 1185° C. to 2000° C., but is preferably maintained at approximately 1500° C. The time of evaporation is continued for any length of time up to the time at which all of the phosphor is exhausted from evaporation boat 10, and is adjusted to cause the deposition of the desired thickness of phosphor upon substrate 8. The thickness of the second-deposited phosphor layer may vary from 1 to 100 microns in thickness or any desired greater thickness, and is selected according to the excitation to which the layer is subsequently to be subjected. Thus, for example, if the phosphor screen is to be excited by 10 kilovolt electrons, it is desirable that it have a thickness of approximately 2.4 microns. If, on the other hand, phosphor layer is to be excited by X-rays, thicknesses of approximately 100 microns are desirable. At evaporation temperature of approximately 1500° C. and a substrate temperature of 25° C., phosphor is deposited upon substrate 8 at a rate of approximately 0.25 micron per minute.

Since the second deposited phosphor layer is to be subsequently activated to luminescence and is the light emitting member of screens produced in accord with the invention, it is essential that principal activator atoms be incorporated into the host phosphor during the evaporation and condensation operation or at some other time prior to crystallization of this layer during heat treatment. This may be accomplished in three alternative fashions. In one preferred method of performing the invention, the phosphor and the principal activator are simultaneously evaporated from the same boat. This may be accomplished by forming the evaporation pellet from an activated luminescent phosphor which has been pressed into a small pellet or from a pressed mixture of host phosphor and principal activator. An activated single crystal of an appropriate phosphor may also be utilized. Alternatively, the pure host phosphor material may be evaporated from one boat, and a mass of the principal activator may be evaporated from a separate boat maintained at the same or at a different temperature. The principal activator may be evaporated simultaneously with the host phosphor material or subsequently thereto, in which case it diffuses into the host during heat-treatment, before crystallization. Evaporation of the principal activator from a separate boat is desirable when an extremely volatile activator such as arsenic or phosphorus is utilized. Accordingly, it is within the scope of the present invention that, during the second deposition step, as well as during the first deposition step, the principal activator may be incorporated into the evaporated and condensed phosphor layer either by simultaneous or separate evaporation of the principal activator. If separate boats are utilized for the phosphor host and the principal activator, the latter boat may remain de-energized during the first evaporation step to deposit a layer of phosphor host material only.

The film formed by the second, low-temperature evaporation step, as is described hereinbefore, is amorphous and is not adapted for luminescence both because a crystalline structure is required for luminescence and because the co-activator is not yet associated with the principal activator.

In further performance of the invention, substrate 8 is removed from bell jar 1 and is placed in a suitable heat-treating apparatus, such as that illustrated in Figure 2, for the completion of activation.

In Figure 2, a suitable heat-treatment furnace comprises a refractory chamber 14 having a gas inlet conduit 15 and a gas outlet conduit 16 connected thereto. The outside of chamber 14 is surrounded by a suitable heater as for example, helically wound resistance heater 17. Substrate 8 is suspended by any suitable manner (not shown) within furnace 14 and the temperature thereof measured with a thermocouple 18 and a suitable indicating meter 19.

Utilizing apparatus such as that illustrated in Figure 2, substrate 8, having thereupon the composite film, is heat-treated at a temperature of from 500° C. to 750° C. for a time of at least a minute or two in an atmosphere containing a gas including the co-activating substance and a second reducing gas, the anion of which is the same as the anion of the host phosphor material. Heat treatment may be carried out for a time of 1 or 2 hours or even longer, but no desirable results are attained by heat treating longer than 2 hours. Since the co-activating substance is generally a halogen and is preferably chlorine, the co-activating gas utilized may be any reducing gas containing a halogen, but is preferably a halogen acid gas such as hydrogen chloride, hydrogen fluoride, hydrogen bromide, hydrogen iodide or mixtures thereof. Likewise, since the phosphor host is generally either a sulfide or a selenide, or a mixture thereof, the reducing gas may be hydrogen sulfide or hydrogen selenide or a mixture thereof respectively. For explanatory purposes it will be assumed that the reducing gas utilized is hydrogen sulfide and the coactivator containing gas utilized is hydrogen chloride. The gaseous atmosphere may then comprise a mixture of these gases with hydrogen chloride being present in quantities of from 2 to 50% by volume. At volumetric mixtures containing less than 2% of hydrogen chloride, insufficient chlorine is generally present to diffuse into the amorphous phosphor layer and cause the complete activation thereof. At volumetric ratios of greater than 50% of hydrogen chloride, the hydrogen chloride attacks the phosphor film, and tends to cause the destruction thereof. These limits apply to all of the aforementioned gases. The reducing gas utilized as for example hydrogen sulfide, is present within the heat treating chamber to present a partial pressure of sulfide within the chamber to prevent the re-evaporation of the phosphor material from the substrate.

The pressure at which the gaseous atmosphere within heat treating chamber 14 is maintained is not critical. For convenience we have found atmospheric pressure to be quite satisfactory. However, there is no reason that superatmospheric or lower than atmospheric pressure may not be utilized in the practice of the invention, since no variation in result is obtained with a wide variation of gaseous pressure. A continuous flow of reducing gaseous mixture is maintained over substrate 8 while in heat treating chamber 14 to insure that no stagnation occurs and that chloride atoms are not exhausted from the region immediately bounding the phosphor layer. Any relative motion between substrate 8 and the gaseous atmosphere is sufficient. Thus, a gentle flow at a velocity of one-half foot per minute is sufficient although higher or lower velocities will suffice.

During heat treatment, as is described hereinbefore, the halogen co-activator atoms diffuse into the amorphous phosphor and become associated with the already-present principal activator atoms to form luminescence sites. If the principal activator has been evaporated in a separate layer over the host phosphor layer, it too diffuses thereinto at this time. Subsequently, the heat treatment causes the amorphous material to crystallize, thus fixing the activator sites in a regular crystal lattice and producing a highly efficient luminescent phosphor layer which possesses all the advantages of transparent luminescent films and none of the disadvantages evaporated films produced by prior art methods.

The following specific examples of the practice of our invention are given by way of example only, and are not to be construed in a limiting sense.

*Example 1.*—The apparatus of Figure 1 is utilized for the vacuum evaporation steps. A two-inch diameter disc of Pyrex glass 0.25" thick was cleaned and polished with "Precisionite" abrasive compound ($Al_2O_3$), washed in distilled water, air dried, and mounted in the evacuation chamber as illustrated in Figure 1. A small pellet weighing approximately 0.5 gram of a standard television white phosphor powder comprising equal quantities of zinc sulfide activated with 0.015 weight percent of silver, and zinc cadmium (50% Zn) sulfide activated with 0.015 weight percent of silver, was compressed under approximately 91,000 p. s. i. pressure. This pill was placed in a platinum evaporation boat and the apparatus was vacuum sealed. The chamber was exhausted to a pressure of less than 1 micron of mercury and the temperature of substrate was raised to 400° C. and maintained at this temperature for approximately 15 minutes to degas the substrate and the apparatus. After 15 minutes, current through the substrate heater was disconnected and, after 15 minutes, the substrate was at a temperature of 150° C. Current was again passed through the substrate heater to maintain the substrate temperature at 150° C. Current was then passed through the evaporation boat raising its temperature to approximately 1500° C. Evaporation from the evaporation boat was continued for approximately 3 minutes during which time a thin layer of phosphor condensed upon the substrate. After this thin layer had undergone two orders of interference color changes, indicating a thickness of approximately 0.25 micron, electrical energy to the substrate heater and the evaporation boat was discontinued. The apparatus was allowed to cool for approximately 30 minutes. After 30 minutes cooling, the substrate had cooled to a temperature of approximately 25° C. At this time, current was again passed through the evaporation boat raising its temperature to approximately 1500° C. These conditions were maintained for approximately 10 minutes during which the remainder of the phosphor pellet within the evaporation boat was evaporated and a film of approximately 2.5 microns thick condensed upon the substrate. The substrate was then removed from the evaporation chamber and placed in a heat treating chamber as illustrated in Figure 2. This chamber had a cross-sectional diameter of approximately 4". The chamber was sealed and, while maintained at room temperature, a flow of approximately 1 cubic foot per hour of hydrogen sulfide gas was passed through the chamber for approximately five minutes to flush all air and oxygen therefrom. After flushing, the flow through the chamber was adjusted to include a flow of hydrogen sulfide gas at a rate of 1 cubic foot per hour and of hydrogen chloride gas at a flow of 0.08 cubic feet per hour. The temperature of the substrate was then raised to approximately 700° by the heater thereabout and maintained at this temperature for approximately 1 hour. After one hour the temperature of the substrate was lowered to room temperature by discontinuing flow of electrical current through the heater and, when the substrate had reached room temperature the furnace was disassembled and the substrate removed and assembled as the faceplate of a demountable cathode ray tube. Under cathode ray excitation the screen exhibited a bright white emission. At a bombardment energy of 10 kilovolts at a current density of 1 microampere per square centimeter, the screen exhibited brightness of 10 foot lamberts.

*Example 2.*—The evaporation process was carried out identically as with Example 1 with the exception that the phosphor pellet comprised a standard green television phosphor of zinc sulfide activated with 0.007 weight percent of copper. After evaporation as in Example 1, the substrate was heat treated in the apparatus of Figure 2 similarly as with Example 1 with the exception that the flow of hydrogen chloride gas through the heat treating chamber was at a rate of 0.25 cubic feet per hour. After heat treating, the substrate was removed and assembled as the faceplate of a demountable cathode ray tube, and exhibited green luminescence under excitation of 10 kilovolt cathode rays.

*Example 3.*—Apparatus similar to that illustrated in Figure 1 was utilized with the exception that two evaporation boats were included. The first boat was constructed of platinum and contained a 0.5 gram pressed pellet of RCA "luminescent-grade" zinc sulfide. The second boat was constructed of molybdenum and contained 10 milligrams of powdered arsenic tri-iodide. A polished and cleaned substrate 2" in diameter and .25" thick was placed within the apparatus which was vacuum sealed and degassed in accord with Example 1. After degassing, the temperature of the substrate was raised to 150° as in Example 1. While the substrate was maintained at this temperature the platinum boat containing the zinc sulfide was raised to a temperature of approximately 1500° C. and maintained at this temperature for approximately 3 minutes during which a thin film condensed thereupon to a thickness of approximately 0.25 micron as evidenced by the occurrence of two orders of interference color changes. The temperature of the substrate was then lowered to room temperature as in Example 1. With the substrate at room temperature, the platinum boat containing the zinc sulfide was raised to a temperature of approximately 1500° C. as in Example 1 and the molybdenum boat containing the arsenic tri-iodide was raised to a temperature of approximately 300° C. in a similar manner. These temperatures were maintained for approximately 10 minutes, during which time a film of approximately 2.5 microns thickness condensed upon the substrate. The substrate was then removed and placed in the heat treating apparatus illustrated in Figure 2. After flushing as in Example 1, the substrate was heat treated at a temperature of 675° C. in a flow of 1 cubic foot per hour of hydrogen sulfide gas and 0.25 cubic feet per hour of hydrogen chloride gas. After heat treatment the substrate was cooled, removed and assembled as faceplate of a demountable cathode ray tube. Under 10 kilovolt electron irradiation the screen emitted blue-green luminescence.

*Example 4.*—The film prepared by this example was prepared as with Example 3 with the exception that the molybdenum boat contained 10 milligrams of red phosphorus ($P_4$). During the second evaporation step this boat was heated to a temperature of 250° C. After heat treatment, as in Example 3, the substrate was assembled as the faceplate of a demountable cathode ray tube and under 10 kilovolt electron irradiation exhibited yellow-green luminescence.

*Example 5.*—The apparatus utilized in Figure 1 was utilized except that two evaporation boats were used. The first boat was constructed of platinum and contained a compressed pellet weighing 0.63 gram of RCA "luminescent-grade" zinc sulfide. The second evaporation boat was constructed of molybdenum and contained 0.13 milligram of metallic silver. After cleansing of the glass substrate and degassing, as in Example 1, the temperature of the substrate was raised to 150° C. The temperature of the platinum boat was then raised to approximately 1500° C. and maintained at that temperature for approximately 3 minutes during which a layer of zinc sulfide approximately 0.25 micron thick was condensed upon the substrate as evidenced by the occurrence of two orders of interference colors. The temperature of the substrate was then lowered to room temperature as in Example 1 at which time the temperature of the platinum boat was raised to approximately 1500° C. and maintained at that temperature of approximately 10 minutes during which time a film of approximately 2.5 microns thickness was condensed upon the substrate. The platinum boat was then de-energized and current was supplied to the molybdenum boat to raise its temperature to approximately 1500° C. This temperature was maintained for approximately 1 minute during which time all of the silver evaporated and condensed in a thin layer upon the just-deposited zinc sulfide layer. The substrate was then removed as in Example 1 and placed in a heat treating chamber as illustrated in Figure 2 and, after flushing as in Example 1, was heat treated at a temperature of 675° C. in a mixed flow of 1 cubic foot per hour of hydrogen sulfide gas and 0.08 cubic feet per hour of hydrogen chloride gas for one hour. After heat treatment, the substrate was returned to room temperature, removed, and assembled as the faceplate of a demountable cathode ray tube. Under 10 kilovolt energy electron excitation the screen emitted blue luminescence.

While the invention has been described in accord with exemplary practices thereof it is immediately apparent that many modifications and changes will occur to those skilled in the art without departing from the invention. Accordingly, we intend by the appended claims to cover all such changes and modifications as fall within the true spirit and scope of the foregoing disclosure.

What we claim as new and desire to secure by Letters Patent of the United States is:

1. The method of preparing a transparent luminescent screen which method comprises the steps of vacuum evaporating upon a transparent substrate a first crystalline layer of phosphor host material, vacuum evaporating upon the crystalline layer a second amorphous layer of the same phosphor host material, and heat-treating the layers in a reducing and activating atmosphere to cause the activation and crystallization of the second layer.

2. The method of preparing a transparent luminescent screen which method comprises the steps of vacuum evaporating upon a transparent substrate a first crystalline layer of phosphor host material, vacuum evaporating upon the crystalline layer a second amorphous layer of phosphor host material, and heat-treating the layers in a gaseous atmosphere containing a first reducing gas the anion of which is the same as the anion of the phosphor material and a second activating gas containing a co-activator for the phosphor material to cause activation and crystallization of the second amorphous layer.

3. The method of preparing a transparent luminescent screen which method comprises the steps of vacuum evaporating upon a transparent substrate a first crystalline layer of a phosphor host material, vacuum evaporating upon the crystalline layer a second amorphous layer of phosphor host material and a principal luminescence activator therefor, and heat-treating the layers in a gaseous atmosphere containing a first reducing gas the anion of which is the same as the anion of the phosphor material and a second activating gas containing a co-activator for the phosphor material to cause activation and crystallization of the second amorphous layer.

4. The method of preparing a transparent luminescent screen which method comprises the steps of vacuum evaporating upon a transparent substrate a first layer of phosphor host material while the substrate is maintained at a temperature sufficiently high to cause the first layer to be deposited in crystalline form, vacuum evaporating upon the first layer a second layer of phosphor host material while the substrate is maintained at a temperature sufficiently low to cause the second layer to be deposited in amorphous form, and heat-treating the layers in a gaseous atmosphere containing a first reducing gas the anion of which is the same as the anion of the phosphor material, and a second activating gas containing a co-activator for the phosphor material to cause the activation and crystallization of the second amorphous layer.

5. The method of preparing a transparent luminescent screen composed of activated phosphor comprising a metal selected from the group consisting of zinc cadmium and mixtures thereof and a non-metal selected from the group consisting of sulphur selenium and mixtures thereof which method comprises the steps of vacuum evaporating upon a transparent substrate a first crystalline layer of phosphor host material, vacuum evaporating upon the crystalline layer a second amorphous layer of the phosphor host material together with a principal luminescence activator therefor, and heat-treating the layers in a gaseous atmosphere comprising a first gas selected from the group consisting of hydrogen sulfide and hydrogen selenide and mixtures thereof and a second gas containing a luminescence co-activator for the phosphor to cause activation and crystallization of the phosphor material.

6. The method of preparing a transparent luminescent screen of an activated phosphor comprising a metal selected from the group consisting of zinc cadmium and mixtures thereof and a non-metal selected from the group consisting of sulphur selenium and mixtures thereof which method comprises vacuum evaporating upon a transparent substrate a first crystalline layer of phosphor host material, vacuum evaporating upon the first layer a second amorphous layer of phosphor host material, and heat-treating the layers in an atmosphere comprising a first gas selected from the group consisting of hydrogen sulfide and hydrogen selenide and mixtures thereof and a second gas selected from the group consisting of hydrogen chloride, hydrogen fluoride, hydrogen bromide and hydrogen iodide to cause activation and crystallization of the second amorphous layer.

7. The method of preparing a transparent luminescent screen composed of activated phosphor comprising a metal selected from the group consisting of zinc, cadmium and mixtures thereof, and a non-metal selected from the group consisting of sulphur, selenium, and mixtures thereof which method comprises vacuum evaporating upon a transparent substrate a first layer of phosphor host material while the substrate is maintained at a temperature sufficiently high to cause the first layer to be deposited in crystalline form, vacuum evaporating upon the first layer a second layer of phosphor host material while the substrate is maintained at a temperature sufficiently low to cause the second layer to be deposited in amorphous form, and heat-treating the layers in a gaseous atmosphere comprising a first gas selected from the group consisting of hydrogen sulfide, hydrogen selenide and mixtures thereof and a second gas selected from the group consisting of hydrogen chloride, hydrogen fluoride, hydrogen bromide, hydrogen iodide and mixtures thereof to cause activation and crystallization of the second amorphous layer.

8. The method of preparing a transparent luminescent screen composed of an activated phosphor comprising a metal selected from the group consisting of zinc, cadmium and mixtures thereof and a non-metal selected from the group consisting of sulphur, selenium, and mixtures thereof which method comprises vacuum evaporating upon a transparent substrate a first layer of phosphor host material while the substrate is maintained at a temperature sufficiently high to cause the phosphor to be deposited in crystalline form, vacuum evaporating upon the first layer a second layer of host phosphor material and a principal activator therefor while the substrate is maintained at a temperature sufficiently low to cause the second layer to be deposited in amorphous form, and heat-treating the layers in a gaseous atmosphere comprising a first gas selected from the group consisting of hydrogen sulfide, hydrogen selenide and mixtures thereof and a second gas selected from the group consisting of hydrogen chloride, hydrogen fluoride, hydrogen bromide, hydrogen iodide and mixtures thereof to cause the activation and crystallization of the second amorphous layer.

9. The method of preparing a transparent luminescent screen composed of an activated phosphor comprising a metal selected from the group consisting of zinc, cadmium, and mixtures thereof and a non-metal selected from the group consisting of sulphur selenium, and mixtures thereof which method comprises vacuum evaporating upon a transparent substrate a first layer of phosphor host material while the substrate is maintained at a temperature of 100° C. to 650° C. to cause the first layer to be deposited in crystalline form, vacuum evaporating upon the first layer a second layer of phosphor host material and a principal activator therefor while the substrate is maintained at a temperature of 0° C. to 100° C. to cause the second layer to be deposited in amorphous form, and heat-treating the layers in an atmosphere comprising a first gas selected from the group consisting of hydrogen sulfide, hydrogen selenide, and mixtures thereof and a second gas selected from the group consisting of hydrogen chloride, hydrogen fluoride, hydrogen bromide, hydrogen iodide, and mixtures thereof to cause the activation and crystallization of the second amorphous layer.

10. The method of preparing a transparent luminescent screen composed of an activated phosphor comprising a metal selected from the group consisting of zinc, cadmium, and mixtures thereof and a non-metal selected from the group consisting of sulphur, selenium, and mixtures thereof which method comprises vacuum evaporating a first layer of phosphor host material upon a transparent substrate while the substrate is maintained at a temperature of 125° C. to 200° C. to cause the phosphor layer to be deposited in crystalline form, vacuum-evaporating upon the first phosphor layer a second layer of phosphor host material together with a principal luminescence activator therefor while the substrate is maintained at a temperature of 0° C. to 100° C. to cause the second phosphor layer to be deposited in amorphous form, and heat-treating the layers in an atmosphere comprising a first gas selected from the group consisting of hydrogen sulfide, hydrogen selenide, and mixtures thereof and a second gas selected from the group consisting of hydrogen chloride, hydrogen fluoride, hydrogen bromide, hydrogen iodide and mixtures thereof to cause the activation and crystallization of the second amorphous layer.

11. The method of preparing a transparent luminescent screen of an activated phosphor comprising a metal selected from the group consisting of zinc, cadmium, and mixtures thereof and a non-metal selected from the group consisting of sulphur, selenium, and mixtures thereof which method comprises vacuum evaporating upon a transparent substrate a first layer of phosphor host material while the substrate is maintained at a temperature of 100° C. to 650° C. to cause the first layer to be deposited in crystalline form, vacuum-evaporating upon the first layer a second layer of phosphor host material together with a principal activator therefor while the substrate is maintained at a temperature of 25° C. to 80° C. to cause the second phosphor layer to be deposited in amorphous form, and heat-treating the layers in a gaseous atmosphere comprising a first gas selected from the group consisting of hydrogen sulfide, hydrogen selenide, and mixtures thereof and a second gas selected from the group consisting of hydrogen chloride, hydrogen fluoride, hydrogen bromide, hydrogen iodide, and mixtures thereof to cause the activation and crystallization of the second amorphous layer.

12. The method of preparing a transparent luminescent screen composed of an activated luminescent phosphor comprising a metal selected from the group consisting of zinc, cadmium, and mixtures thereof and a non-metal selected from the group consisting of sulphur, selenium, and mixtures thereof which method comprises vacuum evaporating upon a transparent substrate a first layer of phosphor host material while the substrate is maintained at a temperature of 125° C. to 200° C. to cause the first phosphor layer to be deposited in crystalline form, vacuum evaporating upon the first layer a second layer of phosphor host material and a principal luminescence activator therefor while the substrate is maintained at a temperature of 25° C. to 80° C. to cause the second phosphor layer to be deposited in amorphous form, and heat-treating the layers in an atmosphere comprising a first gas selected from the group consisting of hydrogen sulfide, hydrogen selenide and mixtures thereof and 2 to 50 percent by volume of a second gas selected from the group consisting of hydrogen chloride, hydrogen fluoride, hydrogen bromide, hydrogen iodide and mixtures thereof to cause the activation and crystallization of the second amorphous layer.

13. The method of preparing a transparent luminescent screen composed of an activated phosphor comprising a metal selected from the group consisting of zinc, cadmium, and mixtures thereof and a non-metal selected from the group consisting of sulphur, selenium, and mixtures thereof which method comprises vacuum evaporating upon a transparent substrate a first layer of phosphor host material while the substrate is maintained at a temperature of 100° C. to 650° C. to cause the first layer to be deposited in crystalline form, vacuum evaporating upon the first layer a second layer of phosphor host material while the substrate is maintained at a temperature of 0° C. to 100° C. to cause the second layer to be deposited in amorphous form, vacuum-evaporating upon the second phosphor layer a thin layer of a principal luminescence activator therefor, and heat-treating the layers in a gaseous atmosphere comprising a first gas selected from the group consisting of hydrogen sulfide, hydrogen selenide and mixtures thereof and 2 to 50 percent by volume of a second gas selected from the group consisting of hydrogen chloride, hydrogen fluoride, hydrogen bromide, hydrogen iodide, and mixtures thereof to cause the activation and crystallization of the second amorphous phosphor layer.

References Cited in the file of this patent

UNITED STATES PATENTS 2,659,678    Cusano et al.           Nov. 17, 1953
2,732,312    Young                 Jan. 24, 1956